Patented Oct. 15, 1940

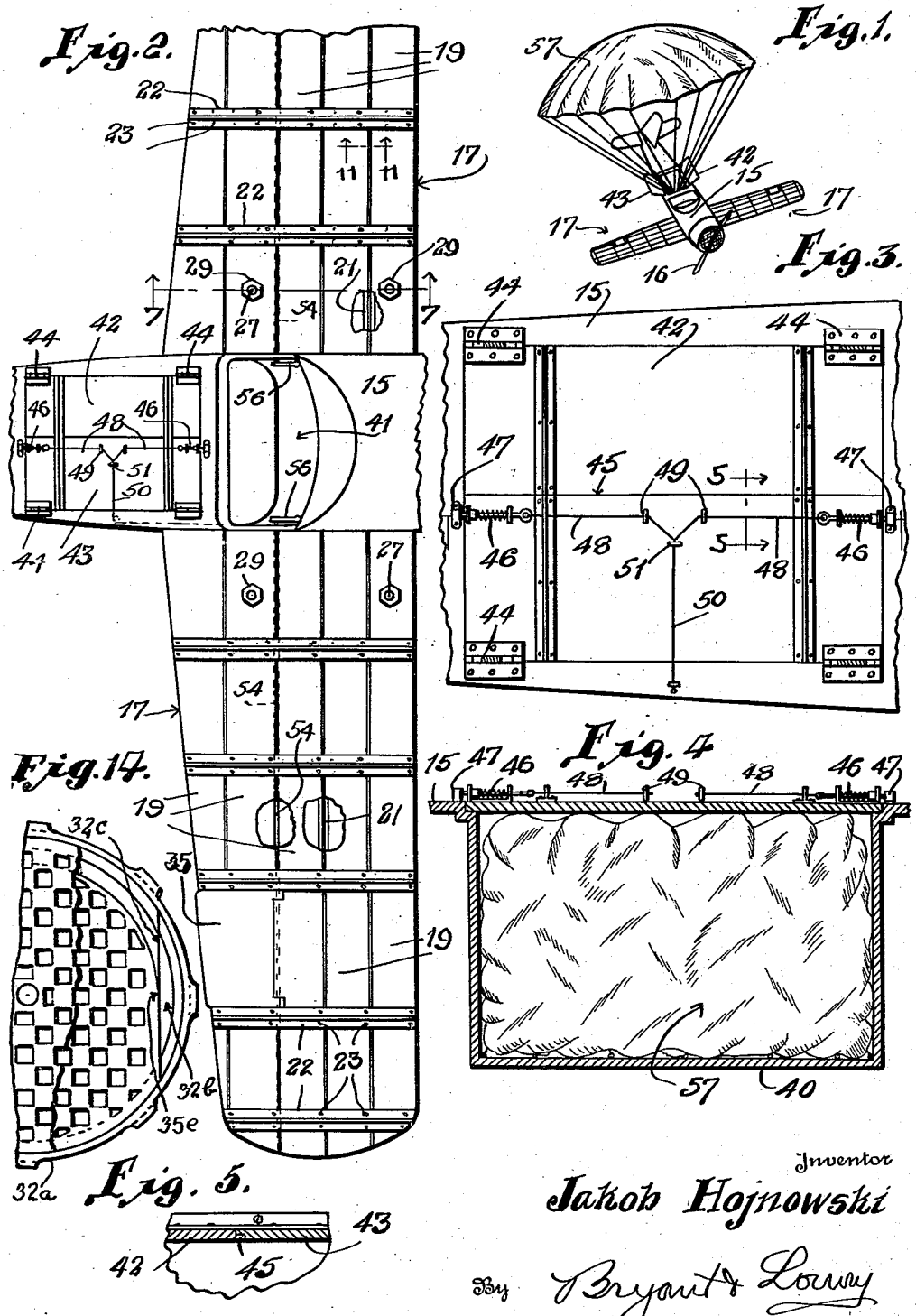

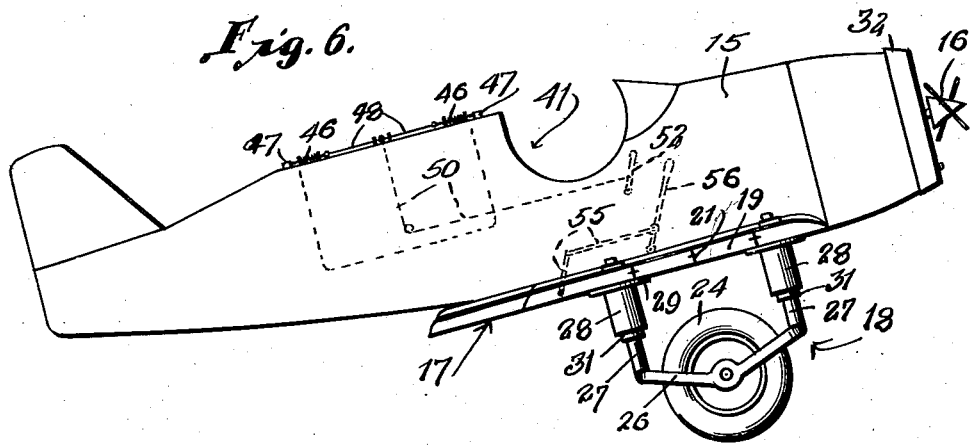

2,218,370

UNITED STATES PATENT OFFICE 2,218,370

AIRPLANE

Jakob Hojnowski, Nekoosa, Wis.

Application June 22, 1938, Serial No. 215,246
In Canada April 29, 1938

1 Claim. (Cl. 244—104)

This invention relates to certain new and useful improvements in airplanes.

The primary object of the invention is to provide an airplane provided with a spring landing gear for the absorption of shocks during the landing of an airplane.

A further object of the invention is to provide an airplane with an improved wing construction that is reinforced and strengthened to eliminate injury thereto.

A still further object of the invention is to equip an airplane with a parachute that is normally confined within a housing in the fuselage of the airplane with the release of the parachute under control of the operator or pilot.

A still further and important object of the invention is to provide a screen or grille structure at the nose end of the airplane in the form of a reticulated shutter that may be closed in inclement weather to prevent the gathering of rain or snow on the motor of the airplane and which may be opened in fair weather for cooling the motor, the invention further contemplating the use of the grille or shutter for the radiator of a motor vehicle.

With the above and other objects in view that will become apparent as the nature of the invention is better understood, the same consists in the novel form, combination, and arrangement of parts hereinafter more fully described, shown in the accompanying drawings and claimed.

In the drawings:

Figure 1 is a perspective view of an airplane constructed in accordance with the present invention and illustrating the parachute in its released and operative position;

Figure 2 is a fragmentary top plan view of the airplane, showing the reinforced panel construction of wing and the housing or compartment for the parachute;

Figure 3 is an enlarged fragmentary top plan view showing the cover doors for the parachute housing and the latch devices for holding them in closed position;

Figure 4 is a longitudinal sectional view taken on line 4—4 of Figure 3;

Figure 5 is a detail sectional view taken on line 5—5 of Figure 3;

Figure 6 is a side elevational view of the airplane showing the resilient landing gear;

Figure 7 is a cross-sectional view taken on line 7—7 of Figure 2, showing the spring devices of the resilient landing gear;

Figure 8 is a horizontal sectional view taken on line 8—8 of Figure 7;

Figure 9 is a front end elevational view of the fuselage of the airplane with the motor shaft in section and illustrating the screen or grille construction at the nose of the airplane;

Figure 10 is a fragmentary longitudinal sectional view showing another form of shutter or grille construction at the nose of the airplane;

Figure 11 is a detail sectional view taken on line 11—11 of Figure 2, showing the cruciform or cross-shaped longitudinally extending reinforcing bars between the longitudinally extending panels comprising the wing structure;

Figure 12 is a cross-sectional view taken on line 12—12 of Figure 11, showing reinforcing T-irons extending transversely of the wing panels;

Figure 13 is a fragmentary side elevational view, partly in section, of the grille at the head of the motor, showing the lock bolt for holding the sliding grille plate in adjusted position, and Figure 14 is a fragmentary front elevational view of the grille shown in Figure 13.

The airplane comprises a fuselage 15 equipped with a forwardly positioned propeller 16, laterally extending wings 17 and a landing gear designated in general by the reference character 18.

The wing structure 17 as shown more clearly in Figures 2, 7, 11 and 12, comprises a plurality of longitudinally extending panels 19 having longitudinally extending grooves 20 in their abutting side edges for the reception of lateral flanges of reinforcing bars of cruciform or cross shape in cross-section as shown at 21 in Figure 11, the vertical legs of the cross-shaped reinforcing bar 21 being exposed at the top and bottom surfaces of the wing 17. The wing panels 19 are further reinforced and held in assembled relation by T-irons 22 arranged in spaced relation and extending transversely of the upper surface of the wing 17 with the T-irons anchored to the panels 19 by bolts 23 extending through the base flanges of the T-irons 23 and said wing panels 19.

The landing gear 18 as shown in Figures 6 to 8 includes two ground wheels 24 respectively arranged at opposite sides of the fuselage 15 as indicated by the supports therefor in Figure 2, each wheel 24 being carried by an axle 25 journaled at its ends in an elongated loop frame 26 with a guide rod 27 rising from each end of the loop frame 26. As shown more clearly in Figure 7, each guide rod extends through a tubular guide 28 that has a flange 29 at its upper end for attachment to the underside of the wing 17, the upper end of the guide rod 27 slidably extending through the wing 17 and threaded at its extended end for the adjustable reception of a nut 29 that is engaged with the upper side of the wing 17. The guide rod 27 is of less diameter than the guide sleeve 28 and within said guide sleeve, the rod 27 is surrounded by a coil spring 30 that engages the underside of the wing 17 at its upper end while the lower end of the spring 30 is engaged with an abutment collar 31 carried by the guide rod 27 for normally tensioning the guide rod and ground wheel 24 in a downward direction. During the landing of the airplane, it will be understood that when the wheels 24 contact the ground, the guide rods 27 are moved upwardly against the tension of the springs 30 for cushioning the landing of the airplane.

The nose 32 of the fuselage rearwardly of the propeller 16 is equipped with a ventilator, shutter or grille for controlling the passage of air to the motor within the fuselage and also operable for protecting the motor from rain and snow and such ventilator construction as shown in Figure 10 comprising a reticulated shutter plate 33 having a central opening therein for the passage of the propeller shaft 34 while an inwardly positioned reticulated plate 35 is rotatably mounted at its central point on the motor shaft 34, said inner reticulated plate 35 is rotatably adjustable by the handle 36 for controlling the passage of air through the openings in the two reticulated shutter plates 33 and 36.

In the form of ventilator construction illustrated in Figure 9, the plate 35ª has a centrally disposed vertical slot 37 to which the propeller shaft 34 and said grid plate 35ª is vertically shiftable by means of the handle 36ª located adjacent the lower end thereof for opening and closing the grid openings.

As shown in Figures 13 and 14, the reticulated shutter plates 33ᵇ and 35ᵇ are flatly engaged with each other, the rearwardly positioned shutter plate 35ᵇ being vertically slidable and carrying a headed screw bolt 35ᶜ that has the threaded shank 35ᵈ projecting forwardly thereof and freely extending through the shutter plate opening 33ᶜ for the reception of a wing nut 33ᵈ that is operable to hold the vertically slidable shutter plate 35ᵇ in its adjusted position with the openings in the shutter plates 33ᵇ and 35ᵇ either in or out of registry. As shown in Figure 14, the nose 32ª of the fuselage carries at diametrically opposite sides thereof segment blocks 32 having opposed parallel vertical edges 32ᶜ and the opposite sides of the vertically slidable shutter plate 35ᵇ have straight edge portions 35ᵉ engaged with the straight edges 32ᶜ of said segment blocks for restraining the shutter plate 35ᵇ from rotative movements and assuring proper registry of the openings in the shutter plates 33ᵇ and 35ᵇ.

The airplane is equipped with a parachute that is normally confined within a housing or receptacle in the fuselage and is adapted to be manually released therefrom should the airplane motor fail to operate to retard the descent of the airplane and effect a safe landing thereof. As shown in Figures 1 to 6, a receptacle 40 is suspended from the top wall of the fuselage 15 rearwardly of the pilot compartment 41 and said receptacle 40 is normally closed at the upper side thereof by doors 42 and 43 hinged at their outer edges as at 44 with the adjacent edges of the doors 42 and 43 mitered as shown at 45 in Figure 5 with the door 43 overlapping the adjacent edge of the door 42. The latch mechanism for the doors 42 and 43 is shown more clearly in Figures 3 and 4 and includes a pair of tensioned latch bolts 46 carried by opposite side edges of the door 43 with the latch bolts projectable into the latch keeper 47 carried by the top wall of the fuselage 15. Each latch bolt 46 is capable of being retracted or released from its keeper 47 by means of pull cords 48 extending through guide eyes 49 carried by the door 43 and connected together to form a single pull cord 50 extending through a guide eye 51 on the door 43 whereby a pull upon the single cord 50 will release both latches 46. As shown in Figure 6, the single pull cord 50 extends forwardly for attachment to the operating hand lever 52 located adjacent the pilot compartment 41 for the release of the parachute 57, shown in Figure 1, in its extended operative position.

The outer trailing edge of each lateral wing section 17 is provided with an aileron 53 normally confined within the plane of the wing, the forward edge of the aileron 53 being fixed to the adjacent end of a shaft 54 that is rotatably supported as shown in Figure 7 between adjacent edges of sections of wing panels 19 in lieu of the reinforcing cross-shaped strip 21, the adjacent ends of the shaft 54 supporting the ailerons 53 terminating adjacent the pilot compartment 41 and being connected by means of a system of levers 55 with a manually operated lever 56, a separate lever 56 being provided for each aileron 53.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:

In an airplane having a wing, a resilient landing gear associated with said wing including a substantially U-shaped frame extending parallel with the fore and aft center line of the airplane and carrying a ground wheel at the lower end thereof, the side legs of the U-shaped frame extending upwardly through the wing, each side leg having a coil spring surrounding the same, a disk abutment on each leg for the lower end of the spring with the upper end of the spring engaged with the underside of the wing, a nut threaded on the upper end of each leg engaging the upper face of the wing and acting in opposition to a downwardly directed force exercised by said coil spring, and a guide cylinder for each coil spring secured to the underside of the wing, depending therefrom and surrounding the coil spring and leg with the upper side of the disk abutment on each leg located in the lower end of its associated guide cylinder.

JAKOB HOJNOWSKI.